3,214,598
MEANS FOR DETECTING AND SELECTIVELY RESPONDING TO A SPECIAL CONDITION IN ANY OF A PLURALITY OF SIMILAR DEVICES

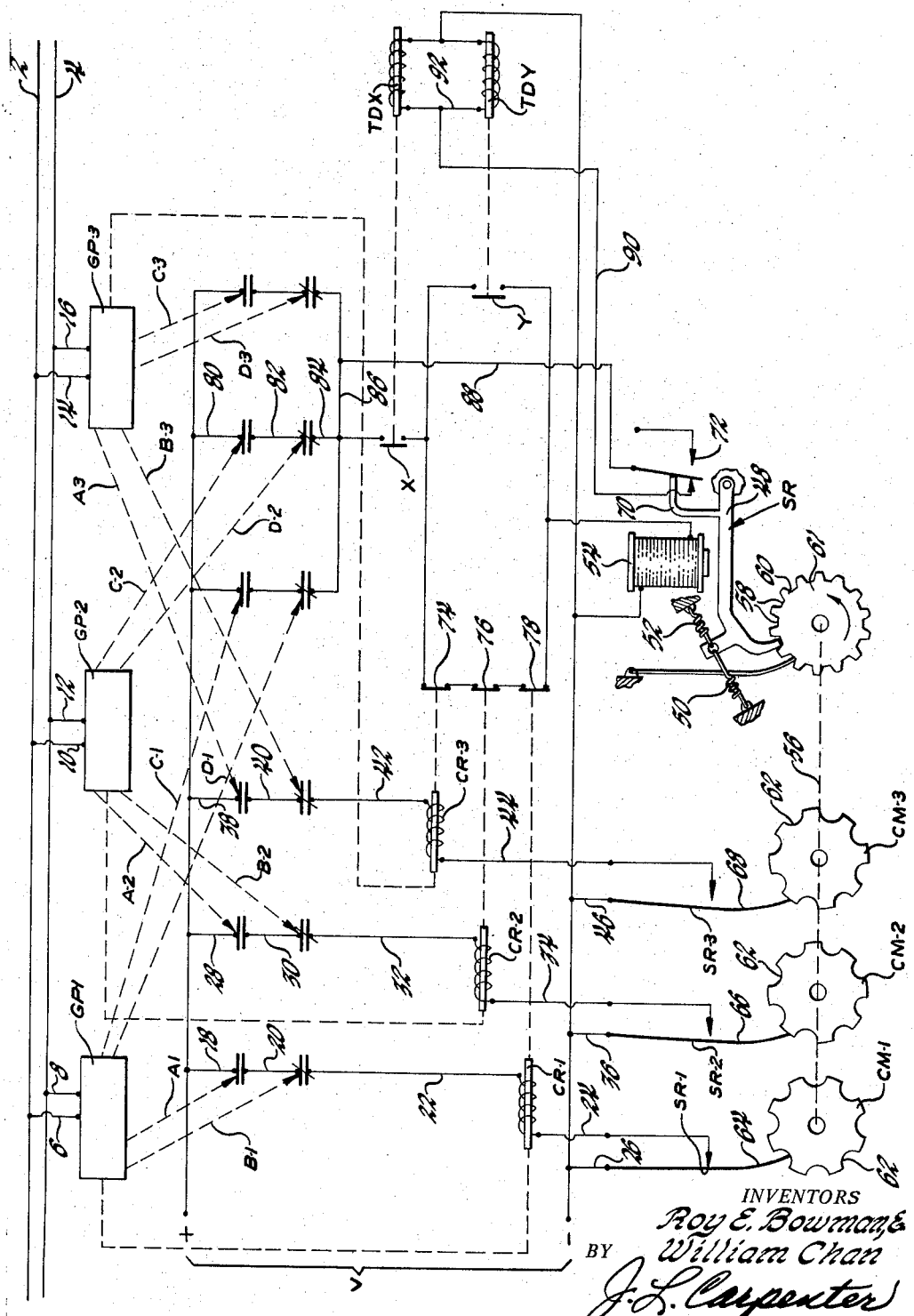

Roy E. Bowman, Downers Grove, and William Chan, Brookfield, Ill., assignors to General Motors Corporation, Detroit, Mich., a corporation of Delaware
Filed Mar. 15, 1960, Ser. No. 15,174
6 Claims. (Cl. 307—57)

This invention relates generally to means responsive to the detection of special conditions in any of a plurality of operating devices. It concerns particularly electro-mechanical means which respond to electrical signals to energize mechanically operated electrical switching means.

The present invention is applicable in the field of power distribution and particularly electrical power distribution. Such an application will be used herein to illustrate and describe the invention.

In order to bring out the importance of the invention and one of its many different applications, a brief general discussion of the particular application herein used to illustrate and describe the invention will precede the detailed description.

In the field of electrical power distribution it is well known that there are occasions when more or less power is needed depending on the demand therefor. Normally, the power in any electrical distribution system is provided by a plurality of similar power generating units which generate definite increments of the total capacity of such a system. It will undoubtedly be appreciated that since during certain periods there is less demand for power, it is most efficient and economical not to run certain of the units connected to the power distribution lines of the system. When, however, the demand increases and the units presently on the line are not able to meet the demand, it becomes necessary to add further units to the line. Before these units can be added, however, they must be properly synchronized with the line frequency (in case the power generated is A.C. power) and they must meet other conditions before they can safely be connected to the lines. It is also desirable that if more than one of these are to be connected, that they not be connected to the lines at the same time. In other words, it is considered most desirable to add the units as quickly and as smoothly as possible one at a time.

The present invention comprises means which detect when any particular unit of a series of power units is ready to be placed on the line and which will then place any units which are ready on the line one at a time. As previously mentioned, however, although this discussion will be mainly concerned with the distribution of electrical power, the invention could also be used many other ways, for example, to selectively detect when a series of engines are ready to be started and then start such engines one at a time.

It is, therefore, an object of this invention to provide means for use with a plurality of devices each adapted to establish a special condition which will periodically and selectively determine whether the condition has been established in any such device.

It is a further object to provide means which will respond to the detection of the condition to effect some change in connection with the device establishing the detected condition.

It is a still further object of this invention to combine such means with a power generating and power distributing system in which a plurality of power generating units are employed so that only one of said units is connected at a time and only when that unit is ready to be connected.

The above objects of the present invention are brought about quickly and in order. This is accomplished by having means which check with each unit in order to see whether that unit is ready to go on the line, and then once such unit has been found ready to go on the line, providing it with sufficient time to go on the line. If, however, the unit which is indicated to be ready does not go on the line, then after a pre-determined interval, the detecting means will move on to the next unit to see whether it is ready to go on the line and remove the opportunity for the unit previously selected to go on the line until the detecting means has recycled.

For a further understanding of these and other objects of this invention, reference may be made to the accompanying drawing which represents a schematic diagram showing the invention in combination with an electrical power generating and distribution system.

Referring now to the drawing, three electrical generating plants are indicated by the symbols GP1, GP2 and GP3. Although three units have been selected to illustrate the invention, it should be appreciated at the outset that it could be used with any number of such units from two to infinity. It may be assumed for the purposes of this description that the units GP1, GP2 and GP3 are identical in every respect and that they constitute a typical generating set which would normally include a prime mover, such as a diesel or gasoline engine, and an electrical generator driven by the engine. In addition they would include the controls normally required in a conventional set of this type.

As illustrated in the diagram, a set of power distribution lines 2, 4 have been provided to which the units may be connected by the conductors 6–8, 10–12 and 14–16. As indicated by the dotted lines extending from the respective power generating units, each unit has directly associated therewith four relays. Those for the unit GP1 are indicated by the numbers A1, B1, C1 and D1. Those for GP2 by A2, B2, C2 and D2, and those of GP3 by A3, B3, C3 and D3.

The raleys A1 and B1 associated with GP1 are provided with normally open and closed interlocks respectively. The interlocks of these latter relays are in series with the energizing winding of a relay CR1 and the make and break contacts SR1 of a relay indicated generally by the symbol SR, and are connected in a circuit extending across a suitable voltage source V and including the conductors 18, 20, 22, 24 and 26. Similar circuits include the interlocks of relays A2, B2 and A3, B3. The first of these latter two circuits comprises the conductors 28, 30, 32, the energizing winding of relay CR2 and conductors 34 and 36. The other of the two circuits includes the conductors 38, 40 and 42, energizing winding of relay CR3, conductor 44 and conductor 46.

Also forming a part of the means for detecting and responding to special conditions in the units GP1, GP2 and GP3 are two relays indicated by the symbols TDX and TDY. Relay TDX is a time delay relay which, when it is energized, delays picking up its interlock X. TDY is also a time delay relay and operates similarly to relay TDX in that when the winding of TDY is energized, there is some delay in the pick-up of its interlock Y. Both TDX and TDY have normally open interlocks when de-energized as indicated by the drawing.

The special stepping relay which has been indicated generally by the symbol SR is typical of many such relays readily available on the open market, and has only been schematically shown here to bring out its function in this detecting and responding means forming the subject of this invention. Relay SR includes a pivoted arm 48 which is biased, as indicated by the anchored springs 50 and 52. Actually, arm 48 constitutes an armature for a solenoid 54, which, when energized, will lift the arm in a clockwise direction so that when the solenoid 54 is deenergized and arm 48 released the operating shaft 56 of relay SR will turn counterclockwise an incremental amount when viewing the drawing. These increments are symbolized by the spaces 58 between the teeth 60 on sprocket 61.

Turning of the shaft 56 of relay SR will also cause turning of the cams CM1, CM2 and CM3 which, depending on the locations of the recesses 62 of these cams, will determine whether the fingers 64, 66 or 68 will make or break the make and break contacts SR1, SR2 or SR3. It should be noted from the arrangement of the cams and the recesses provided therein that only one of the make and break contacts SR1 and SH2 or SR3 will be closed for any given position of the shaft 56 or the sprocket 61 of relay SR. Also connected to the arm 48 is a finger 70 which, when the arm 48 is moved upwardly in a clockwise direction when viewing the drawing, will cause opening of a set of make and break contacts 72.

Referring now for a moment to the relays CR1, CR2 and CR3, it will be noted that each is provided with normally closed interlocks 74, 76 and 78, respectively, which are connected in series with each other.

The operation of the invention in this particular application is as follows:

Let it be assumed first of all that none of the power generating units GP1, GP2 and GP3 are ready to be placed on the power distribution lines 2—4, but that the power demand is such that these units have received a start signal and are being made ready for placing across the line. Let it next be assumed that unit GP2 is now ready. In this situation, the relays A2 and C2 will have been energized, causing their normally open interlocks to close. When this occurs, current may now flow from the positive side of the voltage source through a conductor 80, the now closed interlock of relay C2, conductor 82, the normally closed interlock of relay D2, conductors 84, 86 and 88, make and break contacts 72 of relay SR and conductors 90 and 92 through the windings of the relays TDX and TDY, which are connected in parallel, to the negative side of voltage source V.

As previously mentioned, the circuit just traced out will energize relays TDX and TDY. These relays, however, as previously described, are both of the time delay type so that for a moment their interlocks X and Y will not close. However, after small delay, TDX will pick up and cause its interlock X to close. Closure of interlock X will now allow current to flow from the positive side of voltage source through the energizing winding of solenoid 54 of the stepping relay SR. When solenoid 54 is energized, the arm 48 will be attracted upwardly causing the finger 70 to break the make and break contacts 72 thereby immediately de-energizing relays TDX and TDY causing their interlocks X and Y to drop out. At the same time, movement of the arm 48 upwardly and thence downwardly will cause the sprocket 61 to advance the cams CM1, CM2, CM3 one step. Let it be assumed that movement of these cams will cause closure of the make and break contacts SR2. (Now since the make and break contacts 72 of relay SR have been opened to drop out relay TDX and TDY, and sprocket 61 has moved to the next position, the contacts 72 will again close and the windings of relays TDX and TDY will again be energized.) Closure of contacts SR2 will cause energization of the relay CR2 since the normally open interlock of relay A2 is already closed. Energization of relay CR2 is accomplished by current flowing from the positive side of the voltage source through conductor 28, the now closed interlock of relay A2, conductor 30, the normally closed interlock of relay B2, conductor 32, the energizing winding of relay CR2, conductor 34, the now closed make and break contacts SR2, and conductor 36 to the negative side of the voltage source. Energization of relay CR2 will cause its interlock 76 to open.

Thus we now have the situation where the interlocks X and Y of the relays TDX and TDY, although these two relays are energized, are momentarily open as is the interlock 76. Thus no current can flow into the solenoid 54 of relay SR so that upon subsequent de-energization it will step. The interlock X of relay TDX after delay now picks up, but the interlock Y, of TDY, still remains momentarily open since the delaying action of TDY is greater than that of TDX. This delaying action of TDY is to provide a prescribed time to allow the unit (in this case GP2) to go on the line. Now if for some reason GP2 fails to go on the line within the prescribed time of the delay action of relay TDY, the interlock Y of TDY will close and the solenoid 54 will be energized so that upon subsequent de-energization the relay SR will step, thereby opening the make and break contacts SR2. If the unit GP2 does not go on the line before the SR2 contacts are again opened by stepping of the relay, then GP2 cannot go on the line until the stepping relay SR has cycled. It should also be appreciated at this point that the relay TDX determines the rate of stepping of the relay and relay TDY determines the length of time allowed for the particular unit to go on the line. This will be apparent when it is realized that TDX must close before the relay can step and that TDY must close when any of 74, 76, 78 are open before the relay can step.

Let it now be assumed that the unit GP2 does go on the line in accordance with the foregoing description. Then as mentioned before, since CR2 is energized the interlock 76 of relay CR2 will be open. Also relays B2 and D2 will be energized causing their interlocks to drop out or open (since their interlocks are closed when de-energized). When the interlocks of relays B2 and D2 open, the relay CR2 will be de-energized causing its interlock to again close. Also when the interlock of relay D2 opens, no further energization of the relays TDX and TDY can occur until one of the units GP1 or GP3 is ready to go on the line, in which case their relays A1, C1 and A3, C3, respectively, will close causing the means responsive to such condition to act in the manner described for GP2.

As previously emphasized, the make and break contacts SR1, SR2 and SR3 are closed one at a time for any given position of the cams CM1, CM2 and CM3. In other words, as shown in the drawing, when the relay contacts SR1 are closed, the SR2 contacts corresponding to cam CM2, will be open as will the SR3 contacts corresponding to cam CM3. If the relay now steps, however, the SR1 contacts will be opened, the SR2 contacts will close and the SR3 contacts will remain open. If the relay SR steps again, the SR1 contacts will remain open, the SR2 contacts will open and the SR3 contacts will close.

It may now be appreciated that this stepping relay sequentially closes the make and break contacts SR1, SR2 and SR3 so that if all of the units GP1, GP2, GP3 are ready to go on the line, they will be placed on the line in order, either GP1, GP2, GP3, or GP2, GP3, GP1, or GP3, GP1, GP2. On the other hand, if any one of the units, or any two, or not ready, the detection means including the step relay SR, will still seek to place them on the line one at a time, and will detect in order the first one which is ready and place that one on the line. It should be understood, of course, that if none of the units are ready to be placed on the line, the normally open interlocks of relays C1, C2 and C3 will prevent any energization or operation of stepping relay SR, which will remain dormant until a unit is ready. If only one unit is ready and that unit goes on the line, the stepping relay SR will stop stepping as soon as that one unit is selected for placing on the line. In other words, the stepping relay SR only operates when there is at least one unit which is ready to be placed on the line, but which has not been as yet placed on the line.

A unique electro-mechanical means has been provided which is responsive to a pre-established condition of any of these power generating units GP1, GP2, GP3 and responds to this condition to connect it to the power distirbution system. As has been emphasized here before, this detection and connection takes place in an orderly manner, one unit at a time, to thereby achieve the most desirable and efficient automatic method of applying these units to the line.

We claim:

1. For a plurality of power generating units each having an energizable connection to a power distribution system, means responsive to a pre-established condition of any of said units to energize one at a time the connections of the units which have established said condition, comprising switching means for each of said units actuable to energize the connection for the associated unit including means permitting energization of said connections only one at a time, driving means for said switching means operable to sequentially actuate said switching means, and means for periodically energizing and de-energizing said driving means whereby the connections of the units which have established said condition are seqentialy energized to conect said units to said system one at a time.

2. An electrical stepping relay circuit for use with a plurality of units to be treated one at a time comprising a first relay adapted to be responsive to a signal from any of such units, a stepping relay energizable by said first relay circuit means to energize said first relay controlled by said stepping relay, means associated with said stepping relay to de-energize and re-energize said first relay with each step of said stepping relay whereby said stepping relay is caused to continue to step, and individual switching means adapted to be associated with each of such units and drivingly connected to said stepping relay whereby they are opened and closed one at a time to individually treat such units.

3. The combination claimed in claim 2 in which said first relay is of the time-delay type upon pickup to thereby provide a predetermined time interval between steps of said stepping relay.

4. The combination claimed in claim 2 which further includes individual relays adapted to be associated with each of such units and energizable by closure of the switching means drivingly connected to said stepping relay, said individual relays being operable to de-energize said stepping relay.

5. The combination claimed in claim 4 in which said first relay is of the time-delay type upon pickup to thereby provide a predetermined time interval between steps of said stepping relay.

6. The combination claimed in claim 5 which further includes a second relay of the time-delay type upon pickup the energization of which is controlled by said stepping relay, said stepping relay being energizable by said second relay after a predetermined time interval of de-energization of said stepping relay by said switching means.

References Cited by the Examiner

UNITED STATES PATENTS

| 2,050,373 | 8/36 | Pearson | 307—87 |
| 2,233,533 | 3/41 | James | 317—134 |
| 2,514,889 | 7/50 | McGoffin | 317—134 |

LLOYD McCOLLUM, *Primary Examiner.*

MILTON O. HIRSHFIELD, ORIS L. RADER,
*Examiners.*

UNITED STATES PATENT OFFICE
CERTIFICATE OF CORRECTION

Patent No. 3,214,598

October 26, 1965

Roy E. Bowman et al.

It is hereby certified that error appears in the above numbered patent requiring correction and that the said Letters Patent should read as corrected below.

Column 2, line 40, for "of" read -- for --; line 42 for "raleys" read -- relays --; column 3, line 17, for "SH2" read -- SR2 --; column 4, line 63, for "or", second occurrence, read -- are --; column 5, line 26, for "conect" read -- connect --; line 32, after "relay", first occurrence, insert a comma.

Signed and sealed this 21st day of June 1966.

(SEAL)
Attest:

ERNEST W. SWIDER
Attesting Officer

EDWARD J. BRENNER
Commissioner of Patents